United States Patent [19]

Kaaden et al.

[11] Patent Number: 5,471,124
[45] Date of Patent: Nov. 28, 1995

[54] METHOD FOR DETERMINING THE POSITION IN A CASSETTE RECORDER

[75] Inventors: Jürgen Kaaden, Villingen-Schwenningen; Gerhard Reiner, Schonach, both of Germany

[73] Assignee: Deutsche Thomson-Brandt GmbH, Villingen-Schwenningen, Germany

[21] Appl. No.: 240,752

[22] PCT Filed: Nov. 20, 1992

[86] PCT No.: PCT/EP92/02671

§ 371 Date: Jun. 23, 1994

§ 102(e) Date: Jun. 23, 1994

[87] PCT Pub. No.: WO93/11534

PCT Pub. Date: Jun. 10, 1993

[30] Foreign Application Priority Data

Nov. 29, 1991 [DE] Germany .................... 41 39 218.3

[51] Int. Cl.⁶ .................................................. G05F 1/10
[52] U.S. Cl. .................... 318/650; 242/DIG. 1; 318/560; 360/85; 360/78.02
[58] Field of Search ............ 242/DIG. 1; 318/650, 318/560; 360/85, 78.02, 78.07, 80, 77.12, 75, 27

[56] References Cited

U.S. PATENT DOCUMENTS

| | | | |
|---|---|---|---|
| 4,470,675 | 9/1984 | Di Gianfilippo | 360/80 |
| 4,481,551 | 11/1984 | Maeda | 360/85 |
| 4,821,182 | 4/1989 | Leininger | 360/80 |

FOREIGN PATENT DOCUMENTS

| | | |
|---|---|---|
| 0042960 | 1/1982 | European Pat. Off. . |
| 0104379 | 4/1984 | European Pat. Off. . |
| 0294918 | 12/1988 | European Pat. Off. . |
| 2541010 | 8/1984 | France . |
| 3043041 | 9/1981 | Germany . |
| 3308110 | 9/1983 | Germany . |
| 4017837 | 12/1991 | Germany . |
| 58-224462 | 4/1984 | Japan . |
| 59-203264 | 4/1985 | Japan . |
| 85/03368 | 8/1985 | WIPO . |

OTHER PUBLICATIONS

Patent Abstracts of Japan, vol. 9, No. 72, 2 Apr. 1985 and Japan Pat. No. 59-203264 (*listed above).

Patent Abstracts of Japan, vol. 8, No. 82, 14 Apr. 1984 and Japan Pat. No. 58-224462 (*listed above).

*Primary Examiner*—William M. Shoop, Jr.
*Assistant Examiner*—Karen Masih
*Attorney, Agent, or Firm*—Joseph S. Tripoli; Joseph J. Laks; Sammy S. Henig

[57] ABSTRACT

The determination of the position of a tape thread-in and thread-out mechanism in a cassette recorder is carried out using contact paths together with a slider contact that form position switches. Output signals of the position switches are coupled via a resistor network that combines the output signals and produces an output signal on a single conductor. The resistor network output signal is coupled to an input of an analog-to-digital converter. To improve the reliability of determining the position of the mechanism without requiring the use of highly accurate resistors in the resistor network, the voltage value assigned to each individual position is measured at the output of the network during a calibration operation. The voltage values are stored in a memory and used as the desired values during normal operation.

12 Claims, 2 Drawing Sheets

METHOD FOR DETERMINING THE POSITION IN A CASSETTE RECORDER

The invention relates to a method for sensing a position of a mechanism that controls a storage medium such as, for example, magnetic tape recorder preamble of claim 1. The method is especially applicable to magnetic tape devices for analog and/or digital recording of video and/or audio data as well as data recorders which comprise position switches. This is the case, for example, with cassette identification or loading mechanism position acknowledgement (feedback).

With a tape loading mechanism in a magnetic tape recorder having a rotating head drum (cylinder), the tape is drawn out from the cassette by means of the mechanism and wound around the head drum over an angle of approximately 180 degrees. During the eject (unloading) procedure the tape is guided back into the direction of the cassette. Various systems are known for the mechanism such as, for example, the M-loading in the case of VHS and the C-loading for Video 2000. Differing positions are required by both systems for the various operating states such as playback, pause, winding, cassette eject, etc. Each individual position represents a switching status which serves as a feedback for the controlling electronics. Here, indexing (shift) switches are mainly used, or coding switches or separate switches too. The number of feedback lines in conventional devices is about three or four, depending on the complexity of the mechanism.

In practice it has become apparent that the differences between the voltage values assigned to the individual positions are very small, whereby the evaluation becomes unreliable. Greater reliability can be achieved with very accurate resistors and a stabilized voltage at the resistor network and the reference input of the analog-to-digital converter serving for the evaluation. However, the cost of the circuit is, thereby, increased considerably. It is the object of the invention to guarantee a reliable evaluation despite the small differences between the individual determined voltage values and without needing highly accurate resistors and a stabilized voltage at the resistor network and the analog-to-digital converter. Developments of the invention are given in the subclaims.

Therefore, with the method according to the invention, highly accurate resistors or stabilized voltages are replaced by an intentionally introduced calibration procedure. Practically all deviations among the resistor values or the operating voltage are detected and neutralized through this calibration procedure in that the voltage values measured at the respective positions in the calibrating operation are stored and used as desired (target) values during normal operation. Therefore, it is not the theoretically correct desired values which are used for the comparison in the evaluation electronics but, on the contrary, those values are used as desired values which actually occur at the individual positions in practice and which are determined and stored in a calibration procedure. The resistor network can then be realized with conventional, cost-effective resistors having a greater tolerance, while no highly stable voltage is necessary as the operating voltage for the network and the analog-to-digital converter.

BRIEF DESCRIPTION OF THE DRAWINGS

In FIG. 1 the slider (wiper) contact 'A" is guided by motor M through the linkage line WV over the position transmitter (indicator) B which has three contact paths 1, 2, 3 as well as a contact path 4 clamped to ground. According to the respective position of the sliding contact 'A', the contact paths 1, 2, 4 are connected to the contact path 4. By wiring each of the contact paths 1, 2, 3 always with a resistor to the supply voltage, switching signals can be picked up at lines a, b, c upon connecting contact path 4 to ground, whereby said signals are then fed to the evaluation electronics AE. Each contact path such as contact path 1, 2 or 3, together with wiper contact A forms a corresponding position switch. The resistor network is formed by the resistors R1, R2, R3, each of equal size—22 kOhm, and is connected to an operating voltage of +5 V. An advantageous simplification is the reduction of the lines to one single line, whereby differing direct voltages are created for various switching states via a resistor network. The evaluation electronics AE contain an analog-to-digital converter which converts the analog voltages supplied by the lines 'a', b, c into digital values which can be differentiated.

Figure 1:
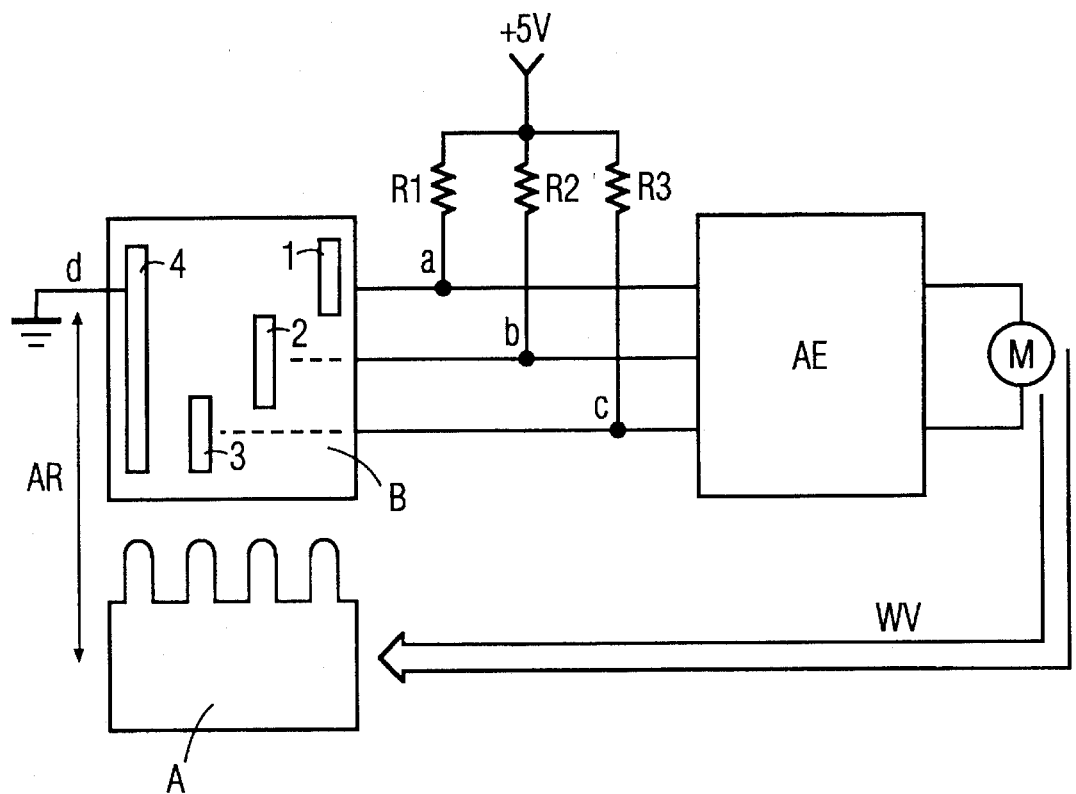
FIG. 1 shows a simplified circuit diagram for determining the position of a mechanism of a tape recorder.
Figure 2:
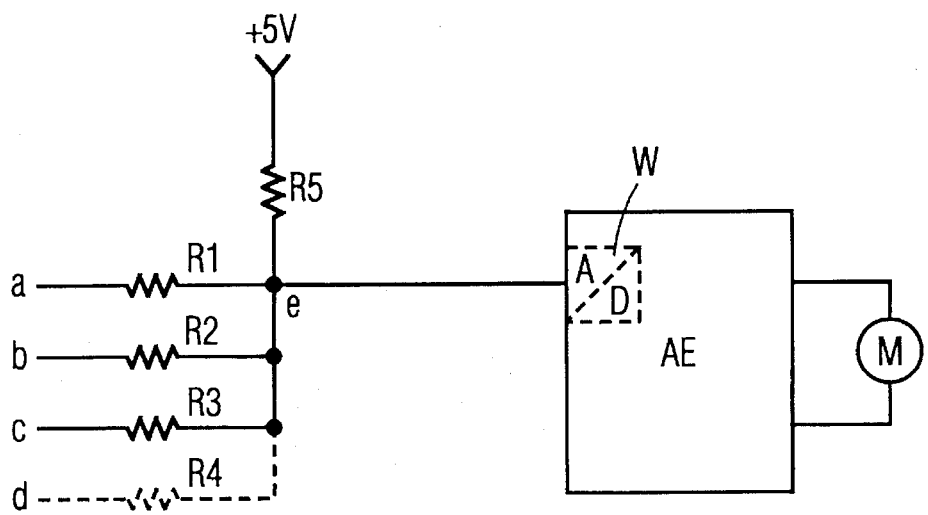
FIG. 2 is a second embodiment of a circuit for determining the position of a mechanism, used for carrying out an aspect of the invention, that utilizes position switches of a resistor network such as shown in FIG. 1.

Such a resistor network with resistors R1, R2, R3, R4 and R5 is illustrated in FIG. 2, whereby the resistors have the folowing values:

R1=27 kOhm

R2=47 kOhm

R3=100 kOhm

R4=220 kOhm

R5=39 kOhm.

The common output e of the resistor matrix (array) R1 through R5 is connected to the input of the analog-to-digital converter W within the evaluation electronics AE.

Figure 3:
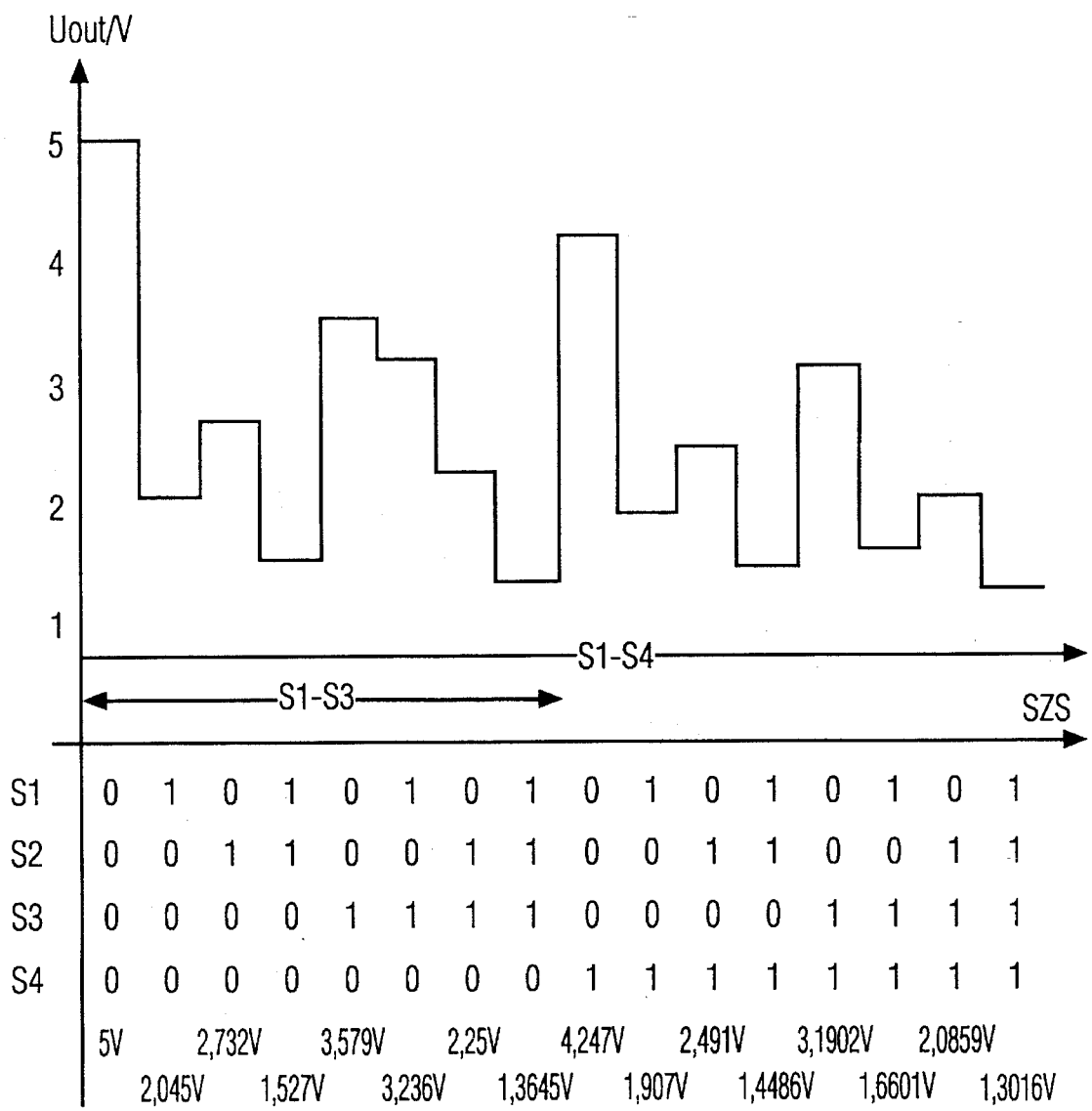
FIG. 3 shows a numerical example for voltage values produced at different positions of the mechanism by the arrangement of FIG. 2.

FIG. 3 shows the respective ensuing direct voltages for the individual possible switching states in numerical and graphical form. If the voltage values which actually occur are known to the evaluation electronics AE, then the limiting values for the recognition of each individual voltage value can be accurately defined. During a test phase, for example, assembly of the device or servicing, a calibration run (operation) is carried out for the analog-to-digital converter W with the connected network. The values measured thereby are stored and used during each insert/eject (loading/unloading) procedure as desired values.

The calibrating operation begins at a prescribed starting position. This "zero position" is triggered first upon calling up the calibration function, hereinafter designated phase 'A'. There are various possibilities for this. For the case presented here, the zero position is the eject position:

1. The eject operation is to be continued until the zero position is reached at all costs. A time criterion is effective in this operation.

2. Carry out the operation until there is a clear increase in the loading motor current. Here, we are dealing with a current inquiry.

3. Continue the operation until a higher order switching position is reached, for example, "cassette ejected" position. Here, we are dealing with a switch inquiry.

The next and subsequent step, namely phase B, is the actual calibrating operation in which the loading mechanism is driven at low speed in cyclic operation, i.e. two cycles "off" and one cycle "on", in the direction of the tape load end position. Any changes in voltage in the measurement line above a threshold value leads to the loading mechanism being stopped, the position counter state being incremented and multiple inquiry of the applied direct voltage value. Following this, an average value is calculated and this value is assigned to a loading position number. These steps are continued until all positions designed for have been measured.

A following step in a further phase C is carried out, but this is not absolutely necessary, however. For this, the loading mechanism is operated at a low speed in the direction of the tape unload end position and, in principle, continued as in the preceeding operation. Merely the position counter state is decremented for each change.

Upon attaining condition 1 (time) or 2 (current) or 3 (switch), the position counter has now reached the starting position again. A difference implies an incorrect measurement and the procedure (phases A, B, C) is carried out once again. The insertion mechanism is now in the starting position again so that a cassette can be inserted immediately in order that further tests can be performed. The values which have been measured and assigned are deposited in a non-volatile memory, for example, an EEPROM, and read out from this after every switch-on procedure. As the calibrating operation is preferably carried out without a tape in order to avoid, for example, superfluous things such as tensioning the tape or switching on the head drum, the warning signals such as "no cassette", "tape end", "tape start", "broken tape" must be deliberately ignored.

We claim:

1. Method for determining the position of a tape thread-in and thread-out mechanism of a cassette recorder having position switches, comprising the steps of:

in a calibration operation, stepping said mechanism through a plurality of positions for producing signals in said position switches that vary in accordance with said plurality of positions;

applying said position switches signals to a resistor network;

applying an output signal of said resistor network to an analog-to-digital converter for producing an output signal of said converter at a plurality of values that are indicative of said plurality of positions, respectively;

storing said plurality of values in a memory; and, in normal operation, retrieving said stored plurality of values for determining the position of said mechanism.

2. Method according to claim 1 wherein the calibrating operation ends automatically when a prescribed number of position changes have occurred.

3. Method according to claim 1, wherein the calibrating operation is divided into two phases which are distinguished from each other through the direction of movement of the mechanism and a counting direction of a position counter.

4. Method according to claim 1, wherein an instantaneous value of said network output signal is compared with a preceeding value.

5. Method according to claim 4, wherein upon registering a deviation of the instantaneous value from the preceeding value, the movement of the mechanism is stopped, a predetermined number of measurements is carried out and the count of a position counter is altered.

6. Method according to claim 4, wherein an average value is formed from a predetermined number of measurements.

7. Method according to claim 1, wherein the calibrating operation is performed at a mechanism speed which is lower than the speed of the mechanism during normal operation.

8. Method according to claim 7, wherein the reduction in mechanism speed is carried out through an alteration to a switch-on time of a motor driving the mechanism.

9. Method according to claim 1, wherein a starting position for the calibrating operation is determined by a switch inquiry.

10. Method according to claim 1, wherein a starting position for the calibrating operation is carried out by measuring a current supplied by the resistor network.

11. Method according to claim 1, wherein a starting position for the calibration operation is determined in a time-controlled manner.

12. Method according to claim 1, wherein the calibration operation is carried out within a test operation.

* * * * *